United States Patent [19]

Shiobara et al.

[11] Patent Number: 5,312,878

[45] Date of Patent: May 17, 1994

[54] NAPHTHALENE CONTAINING EPOXY RESIN CURED WITH A DICYCLOPENTADIENE PHENDIC RESIN

[75] Inventors: Toshio Shiobara; Kazutoshi Tomiyoshi; Takayuki Aoki; Hatsuji Shiraishi, all of Annaka, Japan

[73] Assignee: Shin-Etsu Chemical Company, Limited, Tokyo, Japan

[21] Appl. No.: 955,613

[22] Filed: Oct. 1, 1992

[30] Foreign Application Priority Data

Oct. 7, 1991 [JP] Japan .................................. 3-286993

[51] Int. Cl.$^5$ .......................................... C08F 283/00
[52] U.S. Cl. .................................. 525/507; 525/476; 525/481; 525/487; 525/524; 525/534; 528/98; 528/103; 528/104
[58] Field of Search ............... 525/476, 481, 487, 507, 525/524, 534; 528/98, 103, 104

[56] References Cited

U.S. PATENT DOCUMENTS

| 5,001,174 | 3/1991 | Yanagisawa et al. | 525/481 |
| 5,043,211 | 8/1991 | Yoshizumi et al. | 525/479 |
| 5,108,824 | 4/1992 | Wang et al. | 525/501 |
| 5,143,951 | 9/1992 | Ohta et al. | 528/33 |
| 5,162,400 | 10/1992 | Shiobara et al. | 525/481 |

FOREIGN PATENT DOCUMENTS

| 62-96521 | 5/1987 | Japan . |
| 62-201922 | 9/1987 | Japan . |
| 3-12417 | 1/1991 | Japan . |
| 3-21627 | 1/1991 | Japan . |
| 3-39323 | 2/1991 | Japan . |
| 3-43412 | 2/1991 | Japan . |
| 3-59020 | 3/1991 | Japan . |

*Primary Examiner*—Melvyn I. Marquis
*Assistant Examiner*—Randy Gulakowski
*Attorney, Agent, or Firm*—Birch, Stewart, Kolasch & Birch

[57] ABSTRACT

A thermosetting resin composition comprising (A) a naphthalene ring-bearing epoxy resin, (B) a dicyclopentadiene-modified phenolic resin, and (C) an inorganic filler is suitable for encapsulating semiconductor devices since the composition cures into a product having a low coefficient of expansion, good adhesion and low moisture absorption.

20 Claims, No Drawings

NAPHTHALENE CONTAINING EPOXY RESIN CURED WITH A DICYCLOPENTADIENE PHENDIC RESIN

FIELD OF THE INVENTION

This invention relates to thermosetting resin compositions having improved flow and curing into products having a low coefficient of expansion, a high glass transition temperature, good adhesion, and low moisture absorption and semiconductor devices encapsulated with cured products of the thermosetting resin compositions.

BACKGROUND OF THE INVENTION

The mainstream of the modern semiconductor industry involves resin encapsulated diodes, transistors, IC, LSI, and super LSI. Among various resin compounds for encapsulating semiconductor devices, epoxy resin compositions are in most popular use because they are generally improved in moldability, adhesion, electrical properties, mechanical properties and moisture resistance over the rest of thermosetting resins. The present day trend for these semiconductor devices is toward an increasingly high degree of integration and increased chip size therewith. Packages, on the other hand, are desired to be smaller and thinner in outer dimensions to meet the demands of compactness and light weight for electronic equipment. Further, as to the attachment of semiconductor parts on circuit boards, surface mounting of semiconductor parts is now often employed for the reasons of increased part density on boards and reduced board thickness.

A common approach to the surface mounting of semi-conductor parts is to dip entire semiconductor devices in a solder bath or to pass them through a hot zone of molten solder. Thermal shocks associated with this process cause encapsulating resin layers to crack or incur separation at the interface between the lead frames or chips and the encapsulating resin. Such cracks and separation become more outstanding if the semiconductor device encapsulating resin layers have absorbed moisture prior to thermal shocks encountered during surface mounting Since encapsulating resin layers, however, inevitably absorb moisture in practical manufacturing steps, epoxy resin-encapsulated semiconductor devices after mounting sometimes suffer from a loss of reliability.

SUMMARY OF THE INVENTION

The present invention has been made to overcome the above-mentioned problems of the prior art, and its object is to provide a new and improved thermosetting resin composition exhibiting improved flow behavior and curing into products featuring a low coefficient of expansion, low stresses, a high glass transition temperature (Tg), good adhesion, and low moisture absorption.

Another object is to provide a semiconductor device encapsulated with a cured product of the thermosetting resin composition which remains fully reliable against moisture and thermal shocks during surface mounting.

The inventors have found that a thermosetting resin composition comprising (A) a naphthalene ring-bearing epoxy resin, (B) a dicyclopentadiene-modified phenolic resin of the following general formula (1):

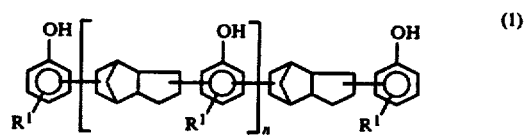

wherein $R^1$ is a hydrogen atom or an alkyl group having 1 to 6 carbon atoms and letter n is an integer of 0 to 15, and (C) an inorganic filler exhibits good flow behavior and cures into products having a low coefficient of expansion, low stresses, a high Tg, good adhesion, and low moisture absorption. The composition is moldable over semiconductor devices. The semiconductor devices encapsulated with cured products of the composition are highly reliable.

In particular, epoxy resin compositions using naphthalene ring-bearing epoxy resins and/or naphthalene ring-bearing phenolic resins are disclosed in a number of patent publications, for example, Japanese Patent Application Kokai (JP-A) No. 21627/1991, 39323/1991, 43412/1991 and 59020/1991. These compositions are based on naphthalene ring-bearing epoxy or phenolic resins and offer advantageous characteristics which are not found in prior art thin package encapsulating resins.

These prior art thermosetting resin compositions comprised of naphthalene ring-bearing epoxy or phenolic resins cure into products which have a low coefficient of expansion, low stresses, a high Tg and low moisture absorption, but are poor in adhesion.

Combined use of a naphthalene ring-bearing epoxy resin and a dicyclopentadiene modified phenolic resin of formula (1) is effective in reducing a percentage water take-up and significantly increasing bond strength. By virtue of the low water take-up and enhanced adhesion, the crack resistance upon solder immersion after moisture absorption is significantly improved. As opposed to prior art packages which cracked when immersed in solder bath at 260° C., quite surprisingly packages encapsulated with the composition of the invention are free of a crack under the same conditions.

DETAILED DESCRIPTION OF THE INVENTION

The present invention addresses to a thermosetting resin composition comprising (A) a naphthalene ring-bearing epoxy resin, (B) a phenolic resin, and (C) an inorganic filler.

Component (A) is a naphthalene ring-bearing epoxy resin. Preferred are naphthalene ring-bearing epoxy resins of the general formula (2):

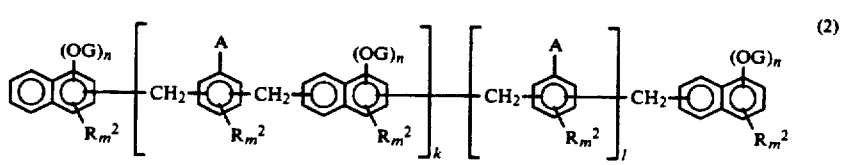

In formula (2), $R^2$ is a hydrogen atom or an alkyl group having 1 to 10 carbon atoms, such as methyl, ethyl and butyl groups, OG is a glycidyl group represented by

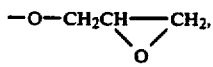

A is a hydrogen atom or

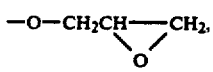

letter k is an integer of from 0 to 5, l is an integer of from 0 to 3, m is an integer of from 0 to 2, and n is equal to 1 or 2. When n is equal to 1, the OG group may be attached to either ring of the naphthalene ring. When n is equal to 2, the two OG groups may be attached to either one ring or both rings of the naphthalene ring.

Preferably, naphthalene ring-bearing epoxy resin (A) contains less than 10% by weight, especially less than 7% by weight of epoxidized products of α-naphthol and α,β-naphthol in view of heat resistance and moisture resistance. Additionally, binuclear compounds consisting of phenols such as diglycidyl ether and phenylglycidyl ether are preferably limited to less than 0.5% by weight, especially less than 0.2% by weight.

Desirably, epoxy resin (A) has a softening point of from 50° to 120° C., especially from 70° to 110° C. and an epoxy equivalent of 100 to 400. An epoxy resin having a softening point of lower than 50° C. has the drawbacks that cured products have too low Tg and molding of the composition is frequently accompanied by burrs and voids. With a softening point in excess of 120° C., the composition would become too viscous to mold.

In the preferred embodiment wherein the composition is used for semiconductor encapsulation, epoxy resin (A) should preferably contain less than 1,000 ppm, especially less than 500 ppm of hydrolyzable chlorine, and less than 10 ppm of sodium and potassium. If a semiconductor device is encapsulated with a resin containing more than 1,000 ppm of hydrolyzable chlorine and more than 10 ppm of sodium and potassium, it would lose moisture resistance when allowed to stand in a high-temperature, high-humidity atmosphere for a long time.

Illustrative, non-limiting examples of the epoxy resin having a naphthalene ring are given below.

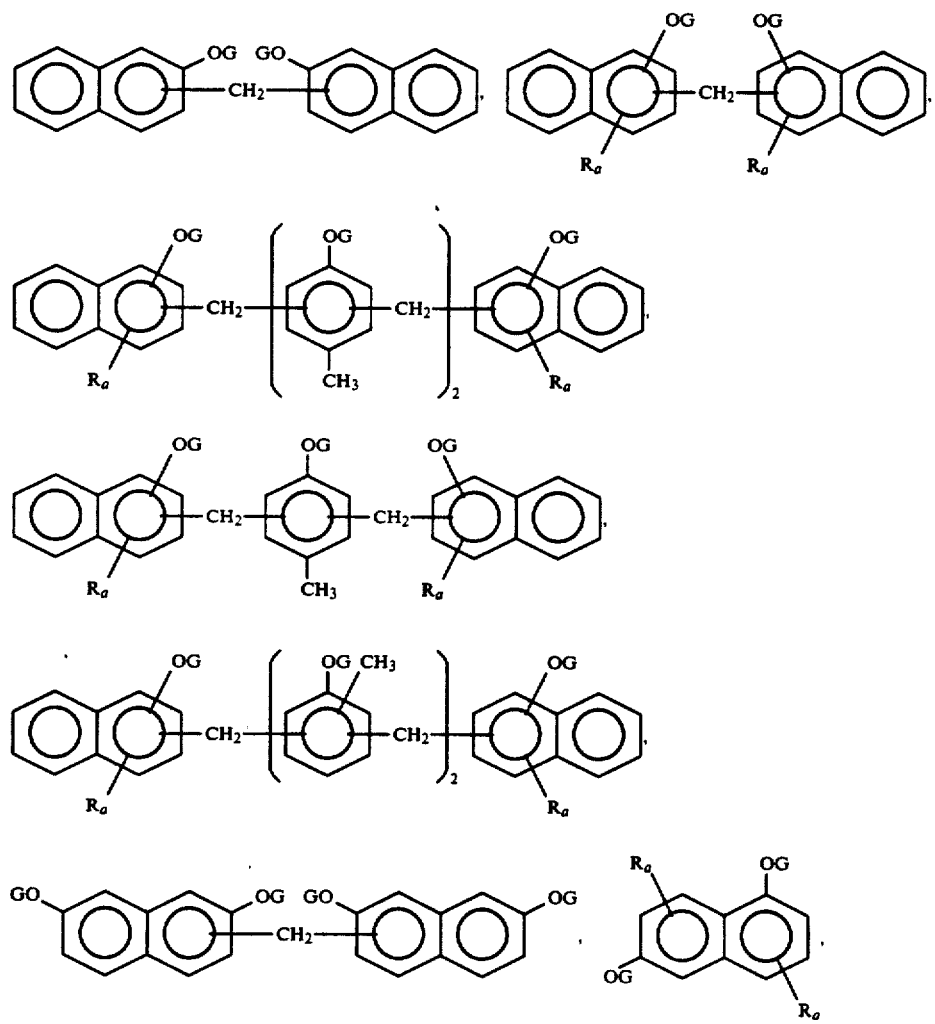

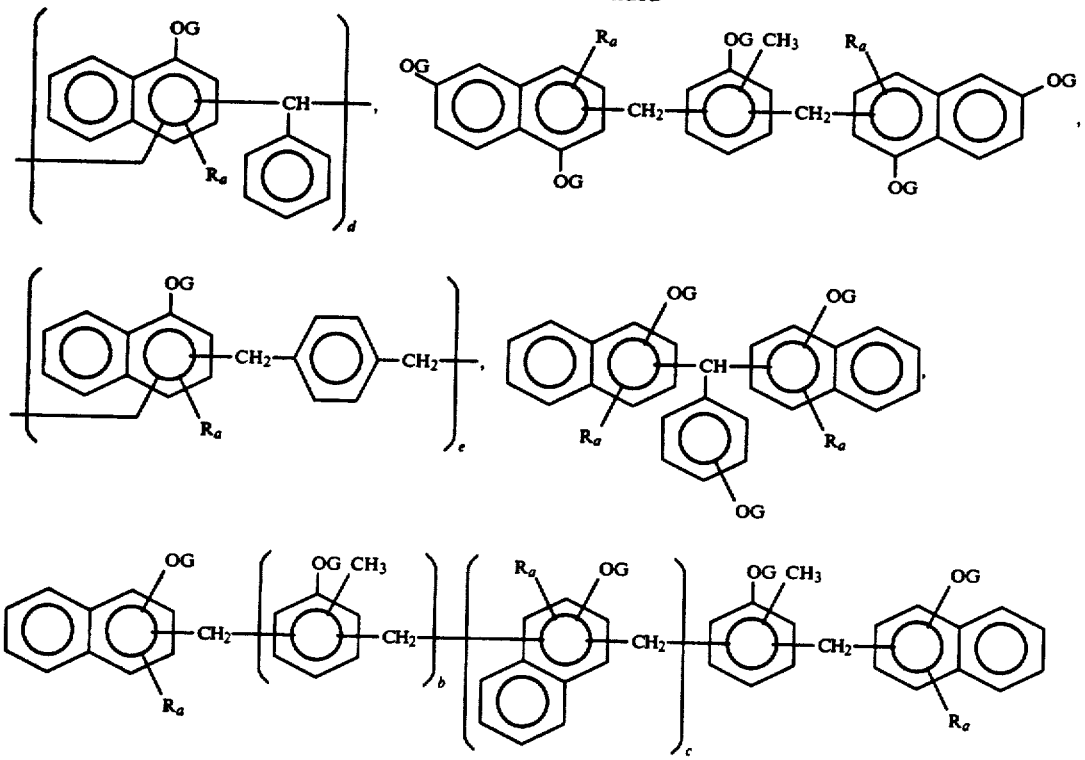

In the formulae, R is hydrogen or a monovalent hydrocarbon group having 1 to 10 carbon atoms, OG is

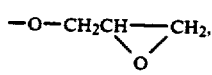

letter a is equal to 1 or 2, b, c, d, and e each are an integer of at least 2.

An essential epoxy resin used in the thermosetting resin composition of the present invention is a naphthalene ring-bearing epoxy resin as defined above while any conventional epoxy resin may be additionally used. Typical of the additional epoxy resin are epoxy resins having at least two epoxy groups in a molecule, for example, bisphenol-A type epoxy resins, phenol novolak type epoxy resins, triphenol alkane type epoxy resins and polymers thereof, dicyclopentadiene-modified phenol type epoxy resins, phenol aralkyl type epoxy resins, glycidyl ester type epoxy resins, cycloaliphatic epoxy resins, heterocyclic epoxy resins, and brominated epoxy resins.

Preferably, the content of naphthalene ring in the naphthalene ring bearing epoxy resin ranges from 5 to 80% by weight, especially from 10 to 60% by weight.

Component (B) is a dicyclopentadiene-modified phenolic resin which serves as a curing agent for component (A) or epoxy resin. It has the following general formula (1):

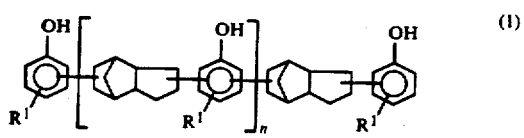

In formula (1), $R^1$ is a hydrogen atom or an alkyl group having 1 to 6 carbon atoms, such as methyl, ethyl, propyl, butyl, hexyl and cyclohexyl groups, and n is an integer of 0 to 15.

Illustrative, non-limiting examples of the phenolic resin of formula (1) are given below.

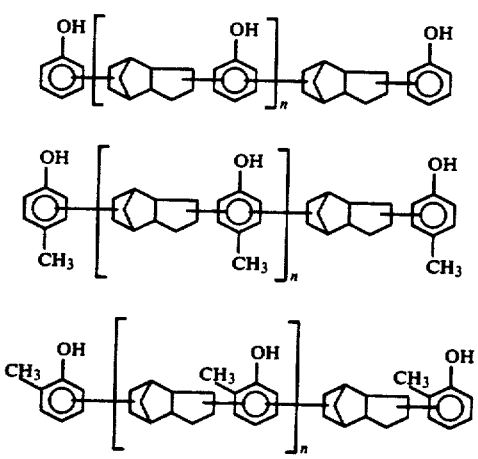

Desirably, the dicyclopentadiene-modified phenolic resin (B) has a softening point of from 60° to 150° C., especially from 70° to 130° C. and a hydroxyl equivalent of 90 to 250, especially 150 to 200.

In the preferred embodiment wherein the composition is used for semiconductor encapsulation, phenolic resin (B) should preferably contain less than 10 ppm of sodium and . potassium. If a semiconductor device is encapsulated with a resin containing more than 10 ppm of sodium and potassium and allowed to stand in a high-temperature, high-humidity atmosphere for a long time, the alkali contents can promote deterioration of moisture resistance.

In the thermosetting resin composition of the invention, the above-defined dicyclopentadiene-modified phenolic resin is an essential component while other phenolic resins may be blended in combination. Examples of the other phenolic resin which can be used herein include phenolic resin having at least two phenolic hydroxyl groups in a molecule, such as novolak type phenolic resins, resol type phenolic resins, phenol aralkyl resins, triphenol alkane type resins and polymers thereof, and naphthalene ring-bearing phenolic resins. Especially, the additional use of a naphthalene ring-bearing phenolic resin leads to a thermosetting resin composition which is less moisture absorptive and more adhesive. Amine curing agents and acid anhydride curing agents may also be used together.

Where the dicyclopentadiene-modified phenolic resin of formula (1) is used in admixture with another phenolic resin, the former should occupy at least 10% by weight, preferably at least 20% by weight of the total phenolic resin components for achieving sufficient adhesion.

The blending ratio of the epoxy and phenolic resins depends on the equivalent ratio of epoxy to hydroxyl group. Desirably, the equivalent ratio of epoxy group to hydroxyl group ranges from 0.5 to 2, especially from 0.8 to 1.5. Accordingly, about 30 to 100 parts, especially about 40 to 70 parts by weight of the phenolic resin is preferably used per 100 parts by weight of the epoxy resin. On this basis, less than 30 parts of the phenolic resin would provide less satisfactory strength whereas if the phenolic resin is more than 100 parts, part of the phenolic resin would be left unreacted, resulting in a loss of moisture resistance.

In the practice of the invention, a silicone-modified copolymer is preferably blended in addition to naphthalene ring-bearing epoxy resin (A) and dicyclopentadiene-modified phenolic resin (B) for enhancing the benefits of the invention. The silicone-modified copolymers which can be used herein include copolymers resulting from addition reaction of epoxy and phenol resins containing an alkenyl group or naphthalene ring-bearing epoxy and phenol resins containing an alkenyl group to organopolysiloxanes, in particular SiH groups thereof.

The following are examples of the epoxy and phenol resins containing an alkenyl group or naphthalene ring-bearing epoxy and phenol resins containing an alkenyl group.

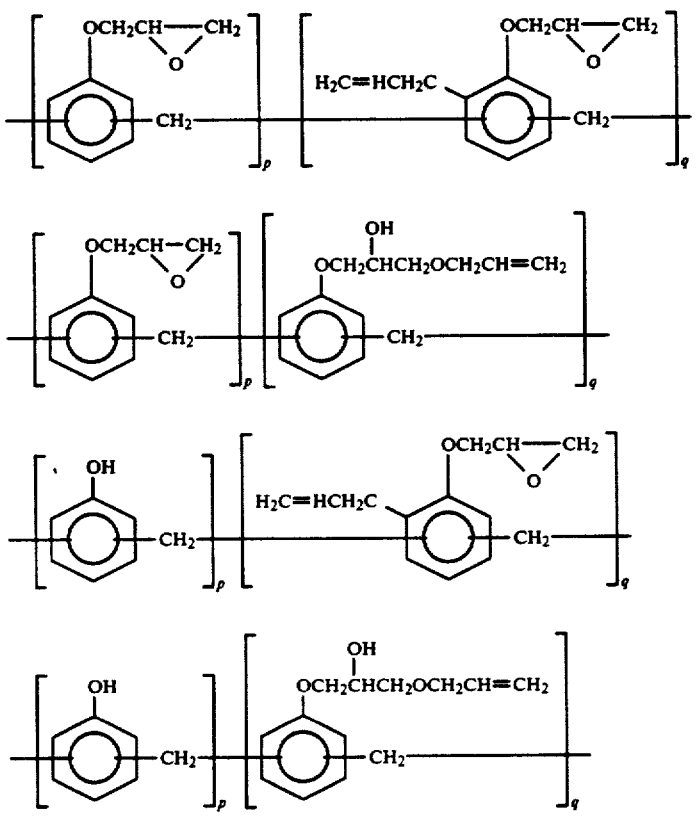

In the formulae, p and q are positive numbers in the range: $1 \leq p \leq 10$ and $1 \leq q \leq 3$.

These epoxy and phenol resins containing an alkenyl group may be prepared, for example, by epoxidizing phenolic resins containing an alkenyl group with epichlorohydrin or by partially reacting well-known epoxy resins with 2-allylphenol.

The organopolysiloxanes to be reacted with the foregoing resins have the following structure, for example.

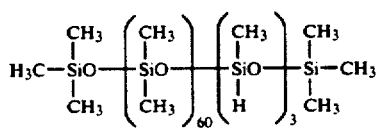

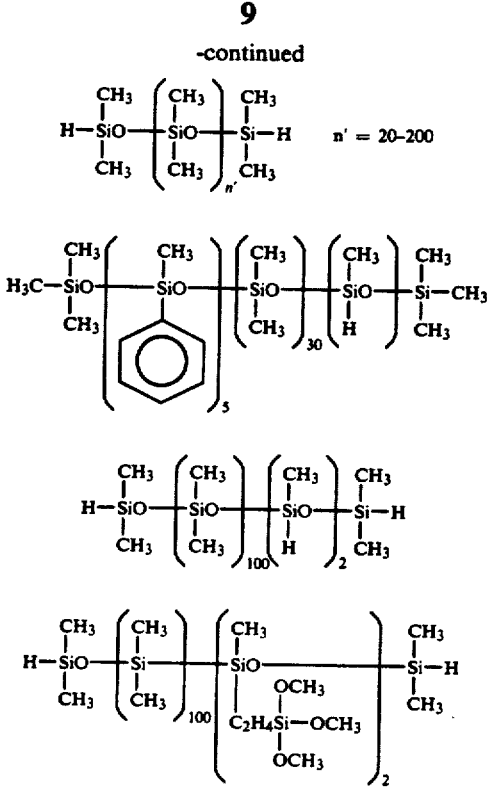

In the composition, the silicone-modified copolymer is preferably blended in amounts of 0 to 50 parts, especially 1 to 30 parts by weight per 100 parts by weight of epoxy resin (A) and phenolic resin (B) combined. More than 50 parts by weight on this basis of the copolymer would rather adversely affect adhesion and provide cured products having a sufficiently high coefficient of water diffusion to allow for water permeation.

Component (C) is an inorganic filler which may be selected from those commonly used for epoxy resins. The inorganic filler is effective for reducing the coefficient of expansion of the encapsulant for reducing stresses to semiconductor elements. Fused silica in ground and spherical forms and crystalline silica are often used as the inorganic filler. Alumina, silicon nitride, and aluminum nitride are also useful. The filler should preferably have a mean particle size of about 5 to 20 μm. It is recommended to use only a spherical filler or a blend of spherical and ground forms in order to achieve both moldability and the low expansion of cured products. The filler is preferably surface treated with silane coupling agents prior to blending.

The inorganic filler is preferably used in an amount of about 200 to about 1,000 parts, especially about 250 to about 800 parts by weight per 100 parts by weight of the total resin components in the composition. On this basis, less than 200 parts of the filler would be too small to accomplish its purposes of reducing a coefficient of expansion and thus reducing stresses to semiconductor elements for preventing deterioration of the elements. Blending more than 1,000 parts of the filler would provide the composition with a too high viscosity to mold.

Additionally, a curing promoter (D) may be added to the composition of the invention. Typical curing promoters are imidazole and its derivatives, phosphine derivatives, and cycloamidine derivatives. Preferably the curing promoter is blended in amounts of 0.001 to 5 parts, especially 0.1 to 2 parts by weight per 100 parts by weight of epoxy resin (A). Less than 0.001 parts of the curing promoter is too small to complete curing within a short time whereas more than 5 parts of the promoter can accelerate the curing rate too fast to form an acceptable molding.

In certain preferred embodiments of the invention, various organic synthetic rubbers, thermoplastic resins such as styrene-butadiene-methyl methacrylate copolymers and styrene-ethylene-butene-styrene copolymers, silicone gel, and silicone rubber in fine powder form may be added for imparting flexibility and toughness to cured products of the thermosetting resin composition. The inorganic filler may be surface treated with a two part type silicone rubber or silicone gel. Among others, the silicone-modified copolymers mentioned above and styrene-butadiene-methyl methacrylate copolymers are effective for reducing the stresses of the epoxy resin.

Preferably, the thermoplastic resin acting as a stress relieving agent is blended in amount of about 0.5 to 10% by weight, especially about 1 to 5% by weight based on the overall thermosetting resin composition. The thermoplastic resin would provide insufficient thermal shock resistance in amounts of less than 0.5% by weight and low mechanical strength in amounts of more than 10% by weight.

If desired, the composition of the invention may further contain mold release agents such as carnauba wax, higher fatty acids and synthetic wax, silane coupling agents, antimony oxide and phosphorus compounds.

The composition of the invention may be prepared by melting and milling the components in a hot roll mill, melting and kneading in a kneader or melting and masticating in a continuous extruder. The order of mixing the components is not critical.

The thermosetting resin compositions of the invention are advantageously applicable in encapsulating various types of semiconductor devices including dual-in-line package (DIP), flat package, plastic leaded chip carrier (PLCC) and small outline (SO) types. The compositions can be molded by conventional methods including transfer molding, injection molding, and casting. Most often, the compositions are molded at a temperature of about 150° to about 180° C. and post cured at a temperature of about 150° to about 185° C. for about 2 to about 16 hours.

It is apparent from the above that the thermosetting resin compositions according to the present invention exhibit improved flow behavior and cure into products featuring a low coefficient of expansion, a high Tg, good adhesion, and low moisture absorption. Semiconductor devices encapsulated with cured products of the compositions are fully reliable.

EXAMPLE

Examples of the present invention are give below together with comparative examples, by way of illustration and not by way of limitation. All parts are by weight.

EXAMPLES 1-5 AND COMPARATIVE EXAMPLES 1-3

Thermosetting resin compositions were prepared by uniformly melt mixing the following components in a hot two-roll mill. The components used were a naphthalene ring bearing epoxy resin, phenol resin, brominated epoxy resin, silicone-modified copolymer, all shown below and used in the amounts shown in Table 1, 550 parts of spherical silica, 10 parts of antimony trioxide, 1.5 parts of γ-glycidoxypropyl trimethoxysilane, 1.5 parts of wax E, 1.0 parts of carbon black, and 0.8 parts of triphenylphosphine.

For these compositions, the following tests (A) to (E) were carried out. The results are shown in Table 1.

(A) Spiral flow

Using a mold according to the EMMI standard, measurement was made at 175° C. and 70 kg/cm².

(B) Flexural strength and Flexural modulus

Test bars of 10×100×4 mm which were molded at 175° C. and 70 kg/cm² for 2 minutes and post cured at 180° C. for 4 hours were tested according to JIS K6911.

(C) Glass transition temperature (Tg) and Coefficient of linear expansion (μ)

Test pieces of 4×4×15 mm which were molded at 175° C. and 70 kg/cm² for 2 minutes and post cured at 180° C. for 4 hours were examined by means of a dilatometer by heating the test pieces at a rate of 5° C./min.

(D) Moisture take-up, Crack resistance upon soldering after moisture absorption, and Moisture resistance Semiconductor devices for an aluminum conductor corrosion evaluating moisture test were encapsulated to flat packages of 2 mm thick by molding a composition around the devices at 175° C. and 70 kg/cm² for 2 minutes and post curing at 180° C. for 4 hours. The packages were maintained in a hot humid atmosphere at 85° C. and RH 85% for 10 hours, allowing the packages to take up moisture. The moisture take-up was measured. Thereafter, the packages were immersed for 10 seconds in a solder bath at 260° C. Then the packages were observed for cracks. Reported is the number of cracked packages/the total number of packages tested. Only the intact packages were then maintained in a saturated steam atmosphere at 120° C. for a predetermined time and the percentage of defective packages was calculated.

(E) Adhesion

Cylinders of 15 mm in diameter and 5 mm high were molded on 42.alloy plates at 175° C. and 70 kg/cm² for 2 minutes and post cured at 180° C. for 4 hours. The samples were allowed to stand at 121° C. and 2.1 atmospheres for 16 hours and then subjected to a vapor phase reflow at 215° C. for 1 minute. Bonding force was determined by measuring the tensile strength between the molded cylinder and the 42-alloy plate.

TABLE 1

|  | Example | | | | | Comparative Example | | |
|---|---|---|---|---|---|---|---|---|
|  | 1 | 2 | 3 | 4 | 5 | 1 | 2 | 3 |
| Composition (pbw) | | | | | | | | |
| Epoxy resin (1) | 50 |  | 33.4 | 30.5 |  |  |  |  |
| Epoxy resin (2) |  | 43.6 |  |  | 21.3 |  |  |  |
| Epoxy resin (3) |  |  |  | 15.0 |  |  |  |  |
| Epoxy resin (4) |  |  | 15 |  |  |  |  | 47.2 |
| Epoxy resin (5) |  |  |  |  |  | 45.5 | 22.3 |  |
| Phenol resin (1) | 22.5 | 46.6 | 41.6 | 44.5 | 43.7 | 44.5 | 42.7 | 42.8 |
| Phenol resin (2) | 17.0 |  |  |  |  |  |  |  |
| Brominated epoxy resin | 10.5 | 10 | 10 | 10 | 10 | 10 | 10 | 10 |
| Silicone-modified copolymer |  |  |  |  | 25 |  | 25 |  |
| Properties | | | | | | | | |
| Spiral flow, cm | 62 | 70 | 95 | 63 | 64 | 63 | 60 | 103 |
| Flexural strength, kg/mm² | 15.3 | 16.0 | 15.0 | 15.4 | 12.8 | 15.0 | 12.5 | 14.8 |
| Flexural modulus, kg/mm² | 1800 | 1890 | 1800 | 1850 | 1480 | 1810 | 1500 | 1730 |
| Tg, °C. | 160 | 163 | 158 | 167 | 165 | 162 | 163 | 128 |
| μ (× 10⁻⁵/°C.) | 1.2 | 1.2 | 1.2 | 1.3 | 1.0 | 1.3 | 1.1 | 1.3 |
| Moisture take-up, % | 0.13 | 0.14 | 0.13 | 0.15 | 0.13 | 0.20 | 0.21 | 0.17 |
| Crack resistance | 0/10 | 0/10 | 0/10 | 0/10 | 0/10 | 8/10 | 10/10 | 3/10 |
| Defective packages after moisture test, % | 0 | 0 | 0 | 0 | 0 | 15 | 8 | 20 |
| Bonding force, kg | 3.8 | 3.9 | 3.8 | 4.0 | 4.2 | 2.3 | 2.8 | 2.1 |

The resins used in these examples are identified below.

| Resin chemical structure | Epoxy equivalent | Softening point |
|---|---|---|
| Epoxy resin (1) | 230 | 46° C. |

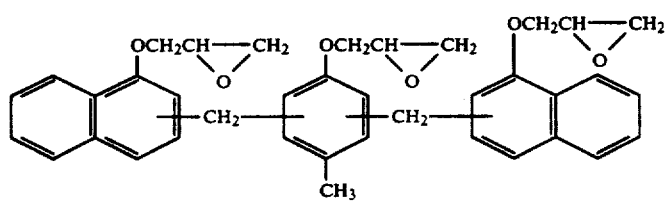

| Epoxy resin (2) | 190 | 75° C. |

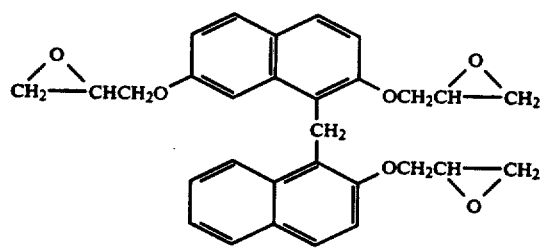
Epoxy resin (3)     160     90° C.
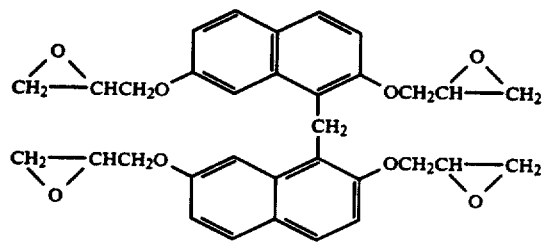
Epoxy resin (4)     195     105° C.
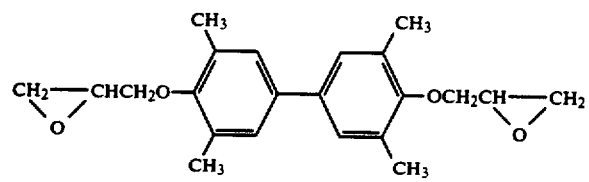
Epoxy resin (5)     210     75° C.
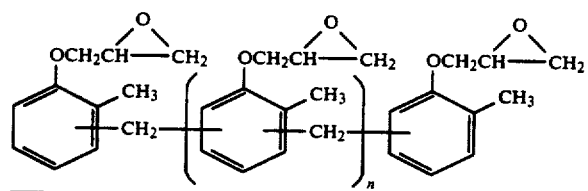
| Resin chemical structure | OH equivalent | Softening point |
|---|---|---|
| Phenol resin (1) | 185 | 79° C. |
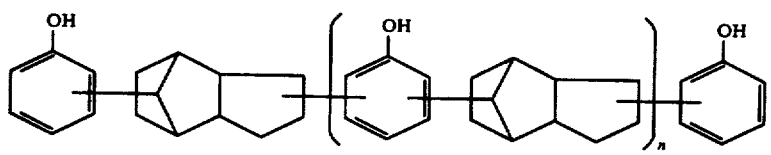
Phenol resin (2)     140     103° C.
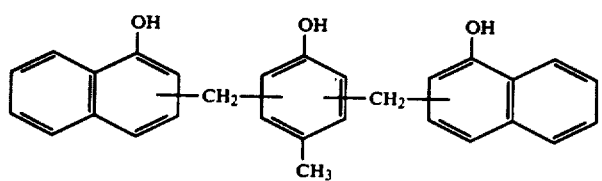
| Brominated epoxy resin | Epoxy equiv. | Softening point |
|---|---|---|

-continued

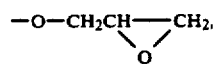

|  | Epoxy equiv. | Softening point |
|---|---|---|
|  | 280 | 64° C. |
| Silicone-modified copolymers | 250 | 75° C. |

In the formulae, n and n' are numbers determined in accordance with the epoxy or hydroxy equivalents.

We claim:

1. A thermosetting resin composition comprising
   (A) a naphthalene ring-bearing epoxy resin,
   (B) a dicyclopentadiene-modified phenolic resin of the following general formula (1):

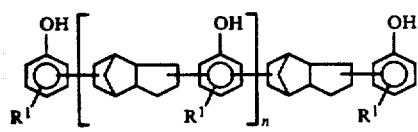

wherein $R^1$ is a hydrogen atom or an alkyl group having 1 to 6 carbon atoms, and letter n is an integer of 0 to 15, and
   (C) an inorganic filler.

2. The thermosetting resin composition of claim 1, wherein the naphthalene ring-bearing epoxy resin has the following general formula:

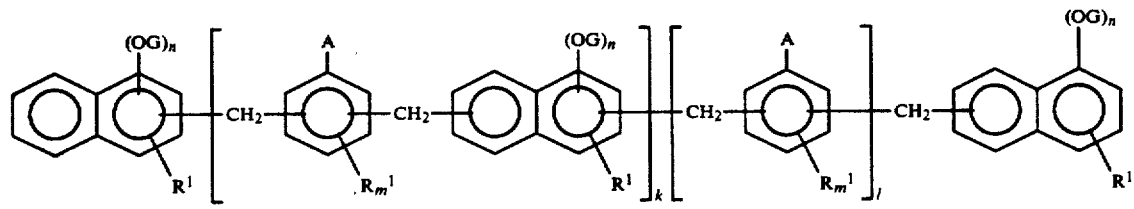

wherein $R^1$ is a hydrogen atom or an alkyl group having 1 to 6 carbon atoms,

OG is a glycidyl group, the $R^1$ and OG groups may be attached to either one ring or both rings of the naphthalene ring, A is a hydrogen atom or $$-O-CH_2CH\underset{O}{\overset{}{-\!\!\!-\!\!\!-}}CH_2,$$

letter k is an integer of from 0 to 5, l is an integer of from 0 to 3, m is an integer of from 0 to 2 and n is equal to 1 or 2.

3. The thermosetting resin composition of claim 1, which contains 100 parts by weight of epoxy resin (A) and 30 to 100 parts by weight of phenolic resin (B).

4. The thermosetting resin composition of claim 1, which contains about 200 to 1,000 parts by weight of filler (C) per 100 parts by weight of the total resin components.

5. A semiconductor device encapsulated with the thermosetting resin composition of any one of claims 1 to 4 in cured state.

6. The thermosetting resin composition according to claim 2, wherein said naphthalene ring-bearing epoxy resin is selected from the group consisting of

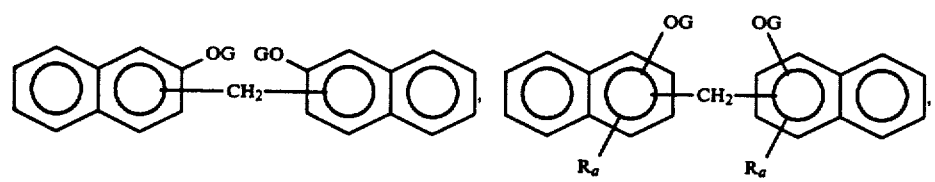
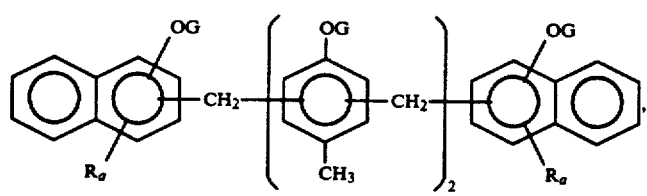
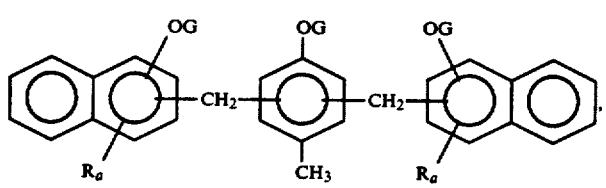
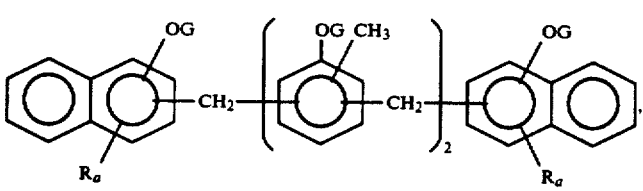
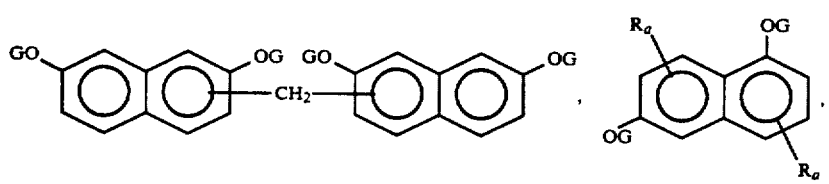
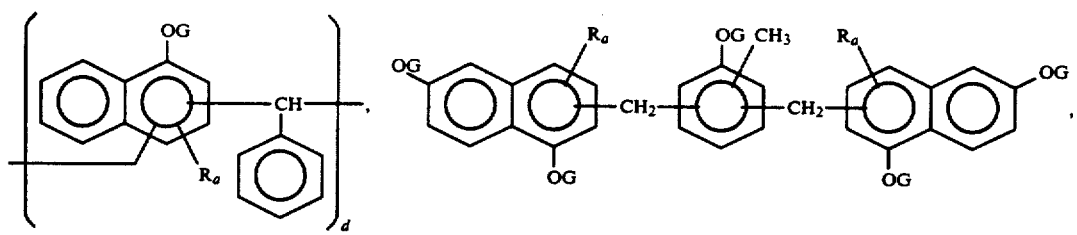
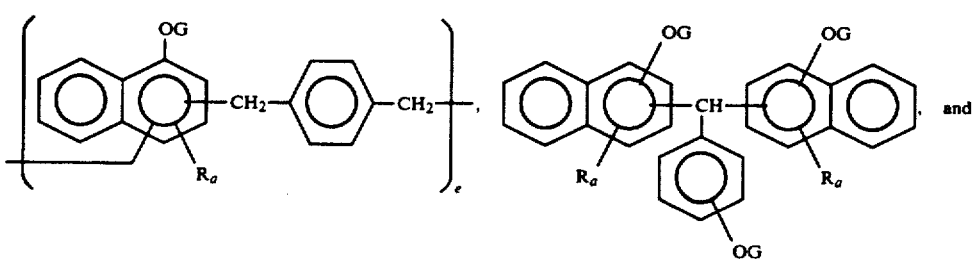

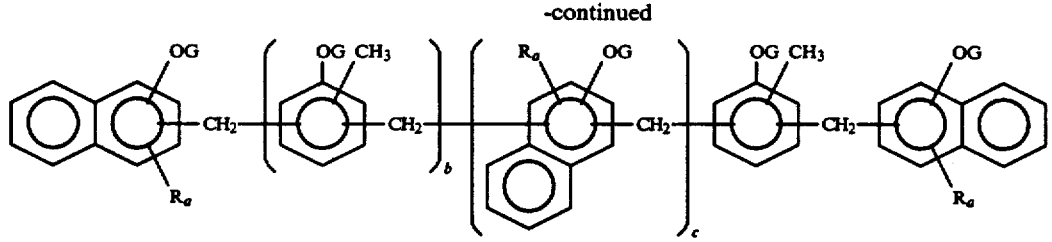

wherein R is hydrogen or a monovalent hydrocarbon group having 1 to 10 carbon atoms, OG is

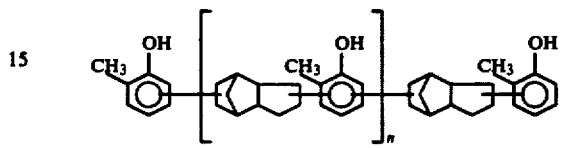

letter n is equal to 1 or 2, b, c, d and e are an integer of at least 2.

7. The thermosetting resin composition according to claim 2, further comprising an epoxy resin selected from the group consisting of bisphenol-A type epoxy resins, phenol novolak type epoxy resins, triphenol alkane type epoxy resins and polymers thereof, dicyclopentadiene-modified phenol type epoxy resins, phenol aralkyl type epoxy resins, glycidyl ester type epoxy resins, cycloaliphatic epoxy resins, heterocyclic epoxy resins, and brominated epoxy resins.

8. The thermosetting resin composition according to claim 2, wherein the content of naphthalene ring in said naphthalene ring-bearing epoxy resin is from 5 to 80% by weight.

9. The thermosetting resin composition according to claim 2, wherein the content of naphthalene ring in said naphthalene ring-bearing epoxy resin is from 10 to 60% by weight.

10. The thermosetting resin composition according to claim 1, wherein said dicyclopentadiene-modified phenolic resin is selected from the group consisting of

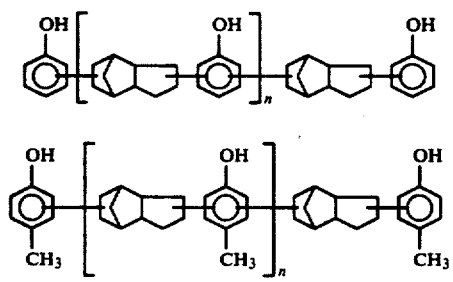

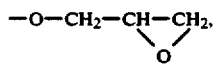

11. The thermosetting resin composition according to claim 1, further comprising a phenolic resin selected from the group consisting of novolak type phenolic resin, resol type phenolic resin, phenol aralkyl resin, triphenol alkane type resin and polymers thereof, and naphthalene ring-bearing phenolic resins.

12. The thermosetting resin composition according to claim 1, wherein said dicyclopentadiene-modified phenolic resin is at least 10% by weight of the total phenolic resin components.

13. The thermosetting resin composition according to claim 11, wherein said dicyclopentadiene-modified phenolic resin is at least 20% by weight of the total phenolic resin components.

14. The thermosetting resin composition according to claim 2, wherein said naphthalene ring-bearing epoxy resin has less than 500 ppm of hydrolyzable chlorine and less than 10 ppm of sodium and potassium.

15. The thermosetting resin composition according to claim 1, wherein said dicyclopentadiene-modified phenolic resin has less than 10 ppm of sodium and potassium.

16. The thermosetting resin composition according to claim 1, wherein the equivalent ratio of epoxy to hydroxyl group is from 0.5 to 2.

17. The thermosetting resin composition according to claim 1, wherein the equivalent ratio of epoxy to hydroxyl groups is from 0.8 to 1.5.

18. The thermosetting resin composition of claim 1, wherein phenolic resin(B) is present in an amount from 40 to 70 parts per 100 parts of epoxy resin(A).

19. The thermosetting resin composition according to claim 1, wherein said inorganic filler is selected from the group consisting of fused silica, alumina, silicon nitride and aluminum nitride.

20. The thermosetting resin composition according to claim 1, further comprising (D) a curing promoter, wherein said curing promoter is selected from the group consisting of imidazole and its derivatives, phosphine derivatives and cycloamidine derivatives, in an amount from 0.001 to 5 parts per 100 by weight of epoxy resin (A).

* * * * *

UNITED STATES PATENT AND TRADEMARK OFFICE
CERTIFICATE OF CORRECTION

PATENT NO. : 5,312,878
DATED : May 17, 1994
INVENTOR(S) : Toshio SHIOBARA et al

It is certified that error appears in the above-indentified patent and that said Letters Patent is hereby corrected as shown below:

On the title page, item [54] and Col. 1, line 3,

IN THE TITLE OF THE INVENTION

Change "PHENDIC" to --PHENOLIC--

Signed and Sealed this

Fourteenth Day of March, 1995

*Attest:*

BRUCE LEHMAN

*Attesting Officer*     *Commissioner of Patents and Trademarks*